United States Patent [19]
Wyss et al.

[11] Patent Number: 5,838,142
[45] Date of Patent: Nov. 17, 1998

[54] BATTERY CHARGER AND A PROCESS FOR AUTOMATIC ADJUSTING OPERATION OF A BATTERY CHARGER

[75] Inventors: Patrick Wyss, Starrkiach; Anton Fessler, Wohlen; Christian Meyer, Walliswil-Bipp, all of Switzerland

[73] Assignee: Impex Patrick Wyss, Morchaltorf, Switzerland

[21] Appl. No.: 951,382

[22] Filed: Oct. 16, 1997

Related U.S. Application Data

[63] Continuation of Ser. No. 594,650, Feb. 2, 1996, abandoned.

[30] Foreign Application Priority Data

Oct. 2, 1995 [EP] European Pat. Off. ............ 95115527

[51] Int. Cl.$^6$ ........................................................ H02J 7/00
[52] U.S. Cl. ............................................ 320/148; 320/106
[58] Field of Search ...................................... 320/106, 148

[56] References Cited

U.S. PATENT DOCUMENTS

| | | | |
|---|---|---|---|
| 4,388,582 | 6/1983 | Saar et al. ............................. | 320/39 X |
| 5,157,320 | 10/1992 | Kuriloff ................................... | 320/39 |
| 5,164,652 | 11/1992 | Johnson et al. ........................ | 320/2 |
| 5,204,611 | 4/1993 | Nor et al. ............................... | 320/39 X |
| 5,229,704 | 7/1993 | Knepper ................................. | 320/48 X |
| 5,449,997 | 9/1995 | Gilmore et al. ........................ | 320/39 X |
| 5,455,499 | 10/1995 | Uskali et al. .......................... | 320/48 X |
| 5,469,043 | 11/1995 | Cherng et al. .......................... | 320/31 |

*Primary Examiner*—Peter S. Wong
*Assistant Examiner*—K. Shin
*Attorney, Agent, or Firm*—Pearne, Gordon, McCoy & Granger LLP

[57] ABSTRACT

The charging voltage $U_L$ of the battery being charged is sensed and amplified by an amplification factor. The amplification factor is determined by the sensed charging voltage. This provides automatic scaling of the charging voltage. The amplification factor K can be repetitively or continuously adjusted during battery charging. The time behavior of the input signal is monitored. The monitoring unit determines whether the time behavior of the input signal fulfills predetermined or given criteria. When a criterion is met, a check-result signal is generated, which controls charging, for example, by stopping charging when the time behavior indicates charging is completed. Time behavior is monitored by monitoring a second order time derivative of the input signal. The monitoring unit performs optimally within a certain magnitude range. Therefore, the amplification factor is adjusted to set the input signal at a magnitude within that range.

32 Claims, 7 Drawing Sheets

BATTERY CHARGER AND A PROCESS FOR AUTOMATIC ADJUSTING OPERATION OF A BATTERY CHARGER

This is a continuation of application Ser. No. 08/594,650, filed Feb. 2, 1996 now abandoned.

BACKGROUND OF THE INVENTION

The present invention relates to a process for the automatic adjustment of a battery charger and a corresponding battery charger.

There are known to be battery charger s which can variably charge accumulator batteries and/or chargeable batteries, in particular NiCd or NiMH batteries, which have different rated voltages. In this case, in order to obtain the above-mentioned variability, without manually changing the charges in dependency of the rated voltage of a battery to be charged, it is necessary to accept that the accumulator batteries are not optimally charged if their specific rated voltage is above or below an average rated voltage range specific to the chargers.

It is known that such battery chargers may have a monitoring unit, including, for example, a charging controller such as the integrated circuit of the U2402B type as sold by Telefunken. The charging controller serves to monitor the time behavior of the charging process by monitoring the charge voltage and terminates the charging process in a timely fashion. To control the charging process, it is common to monitor the second time derivative, generally known as "gradient monitoring", making it possible to clearly detect the areas of top-off charging and of maintenance charging by monitoring the variation in time of the charge voltage.

If such monitoring is used on chargeable accumulator batteries with different rated voltages, the instantaneous charge voltage, which varies over a wide range depending on the rated voltage of the battery being charged, must be monitored.

Further, it is known that electronic monitoring units usually are designed to monitor the specific range of the signal under surveillance where monitoring reliability is optimal. If signals to be monitored lie in the boundary regions or outside of this optimal range, the monitoring function will be fulfilled to a certain degree, but with decreased accuracy.

It is an object of the present invention to uniformly charge accumulator batteries with different rated voltages at an optimal rate.

SUMMARY OF THE INVENTION

In accordance with a process according to the present invention, by measuring the charging voltage continuously, or at specific time intervals during the charging process, the assumed rated voltage of the battery being charged is determined. By weighting the signal which is monitored through amplification or deamplification, the monitored signal is shifted into a signal range which is optimal for monitoring. Assumptions made from measurements taken at a beginning of the charging process should preferably be checked by subsequent measurements and, if necessary, corrections should be made.

By repeated or continuous measurement of the charge voltage and determination of the weighting factor in accordance with the respective measurement result, an incorrectly estimated rated voltage at the beginning of the charging process may be corrected. For example, if a battery with a relatively high rated voltage is deeply discharged, it may be determined to have a low rated voltage initially, but this determination will be corrected on the basis of a later measurement. Thus, a charging process is proposed using a flexible means to determine the rated voltage of the battery being charged, thereby ensuring that the charging process is performed optimally in each case.

In a further development of the process in accordance with the present invention, it is proposed to carry out the charging process with a controllable current source and to measure the charging voltage at the beginning of the charging process, thereby predetermining the charging current at the beginning. With the result of such measuring, the capacity (Ah) of the accumulator battery being charged is identified and the controllable current source is correspondingly set for the further charging process. Preferably, this is achieved by activating pre-determined charging current versus time courses according to the identified capacity, by means of corresponding command or rated variable courses in a charging current circuit negative feedback loop with the controllable current source as an adjusting member.

The above-mentioned object is further resolved by means of the battery charger.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
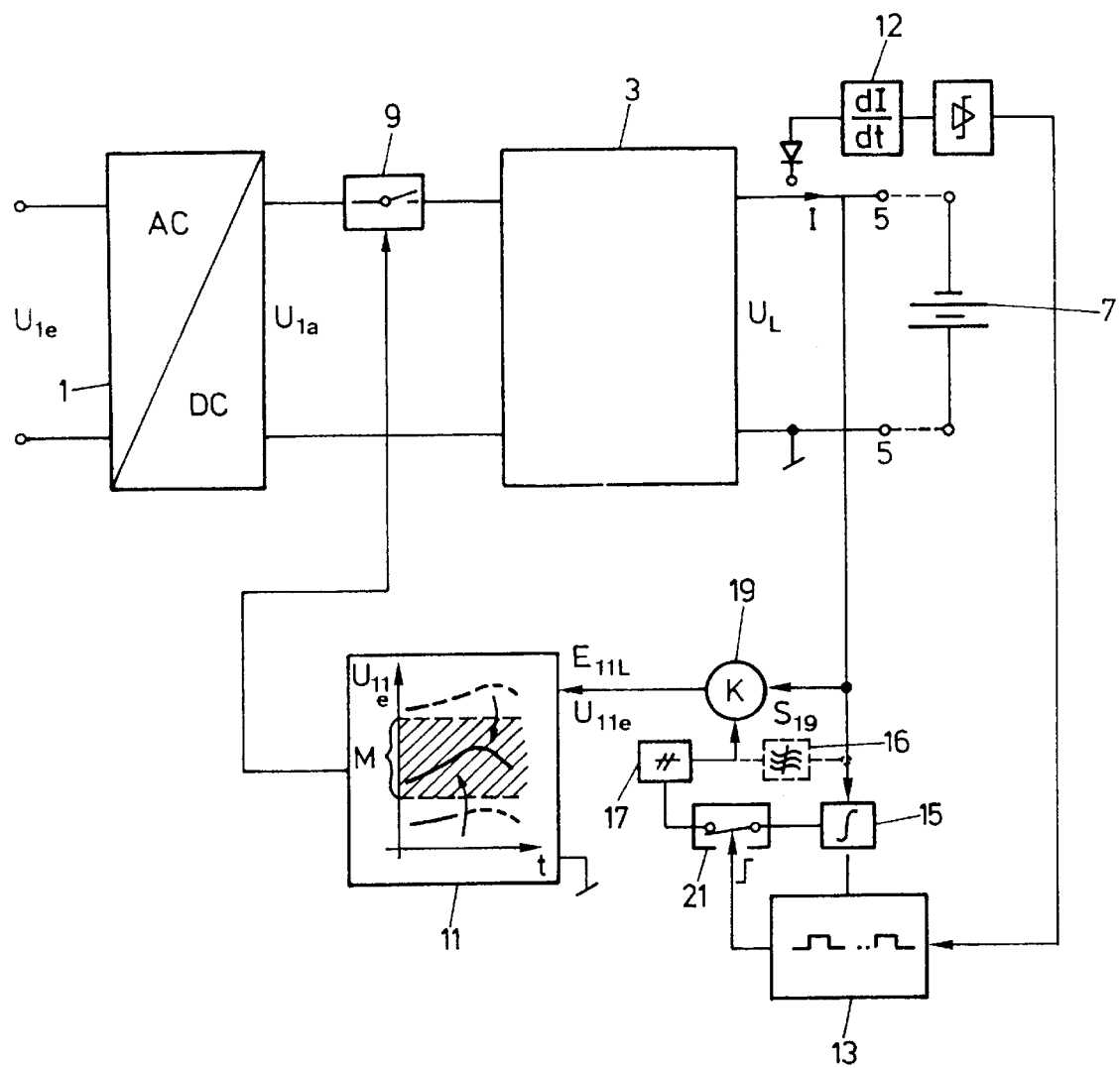
FIG. 1 is a functional unit/signal flow diagram of a battery charger according to the present invention.

With reference to FIG. 1, an input-side alternating current $V_{1e}$, is converted into a DC voltage $U_{1a}$, by means of an AC/DC converter 1. Via a transfer unit 3, as will be explained further below, charging outputs 5 are fed with a charging current I. A chargeable accumulator battery 7 is connected to the charging outputs 5. An operating switch 9 enables/disables the charging process.

A monitoring unit 11 is supplied with a signal $U_{11e}$ at an input $E_{11L}$. The signal $U_{11e}$ is a function of the charging voltage $U_L$, which appears between the charging outputs 5 during charging of the accumulator battery 7. The monitoring unit 11 monitors the charging process preferably by following the time behavior of the charging voltage $U_L$. When a given criterion is reached or satisfied, the monitoring unit 11 stops the charging process by sending an output signal to the operating switch 9 which causes the switch 9 to move from an enabling or closed position to a disabling or open position.

Preferably, $d^2U_{11e}/dt^2$, the second derivative of $U_{11e}$, is determined by the monitoring unit 11. When this derivative value, following the gradient monitoring methods, reaches the top-off charging phase, the respective maintenance charge phase is detected. Thereafter, the charging process is terminated, as described hereinbefore.

As is shown schematically in FIG. 1, in the block of the monitoring unit 11, the above-mentioned derivative value is determined optimally only within a predetermined band or signal range M. The derivative result signal is tuned to the range M by comparators that detect when the monitored signal reaches a predetermined value. If the accumulator battery 7 being charged shows a low rated voltage $U_L$ with respect to the range M, the voltage $U_L$ will result in a monitored signal which lies outside the measurement range M; the same is true for accumulator batteries 7 with a high rated voltage, as illustrated.

A time control unit 13 is enabled by detection of the start of a charging current I by a detection unit 12. The charging voltage $U_L$ is averaged by an integration unit 15 over a time span which can be preset with the time control unit 13.

The average charging voltage control signal is fed to a control input $S_{19}$ of a weighting unit 19 via a holding unit 17. Supplying the average charging voltage control signal to the weighting unit occurs, for example, for the first time at the beginning of the charging process. The control unit 13 enables/disables communication of the control signal to the weighting unit, as is shown schematically by a switch unit 21 connected to the control input $S_{19}$ via the holding unit. The control signal supplied to the control input $S_{19}$ of the weighting unit 19 enables the weighting unit 19 to amplify or dampen the voltage signal $U_L$ to shift the signal $U_{11e}$ into the measurement band or signal range M of the monitoring unit 11. By shifting the signal $U_{11e}$ into the measurement band or signal range M of the monitoring unit 11, the charging voltage behavior is always optimally monitored, independent of the rated voltage of the accumulator battery 7 being charged.

Since the discharging status of the battery is not yet known, the charge voltage $U_L$, which acts on the control unit 13, and which is determined at the beginning of the charging process, does not necessarily accurately identify the true rated voltage of the accumulator battery. For example, if the accumulator battery 7 is deep-discharged, a weighting is first performed by the weighting unit 19, which shifts the monitored signal into the measurement band or signal range M, just as if the accumulator battery 7 were less discharged but had a lower rated voltage. Therefore it is preferable that the average charging voltage supplied to the weighting unit input $S_{19}$ is re-calculated by the integration unit 15 at repeated, regular intervals. Supplying the recalculated control signal to the weighting unit 19 at regular intervals will alter the weighting or scaling factor K to correspond with changes in the charge voltage $U_L$ as the charging process proceeds. The weighting factor K is thereby adjusted and corrected periodically. The result is that, the monitored signal $U_{11e}$, which corresponds then to the correct rated voltage of the battery 7, stays centered within the measurement range M. This is particularly important during the monitored time phases toward the end of the charging process to be described hereafter. The holding unit 17 supplies the current average voltage control signal to the weighting unit input $S_{19}$. The control signal supplied by the holding unit 17 remains unchanged, as does the weighting factor K, until a new control signal is determined or calculated by the integration unit 15 and supplied to the holding unit 17 via the switch unit 21.

As should be appreciated, the adjustment of the weighting factor K can be carried out either at predetermined times during the charging process, at predetermined time intervals, or continuously during the charging process. This is evident from the fact that, with the time control unit 13 controlling the switch unit 21, the intervals between signal connections from integration unit 15 to the weighting unit input $S_{19}$ can be chosen to be as short as desired. It is also possible to directly connect the control signal output by the weighting unit input $S_{19}$ via a low pass filter, as is shown by dashed lines in FIG. 1, to continuously supply the $U_L$ signal to the weighting unit 19.

Figure 2:
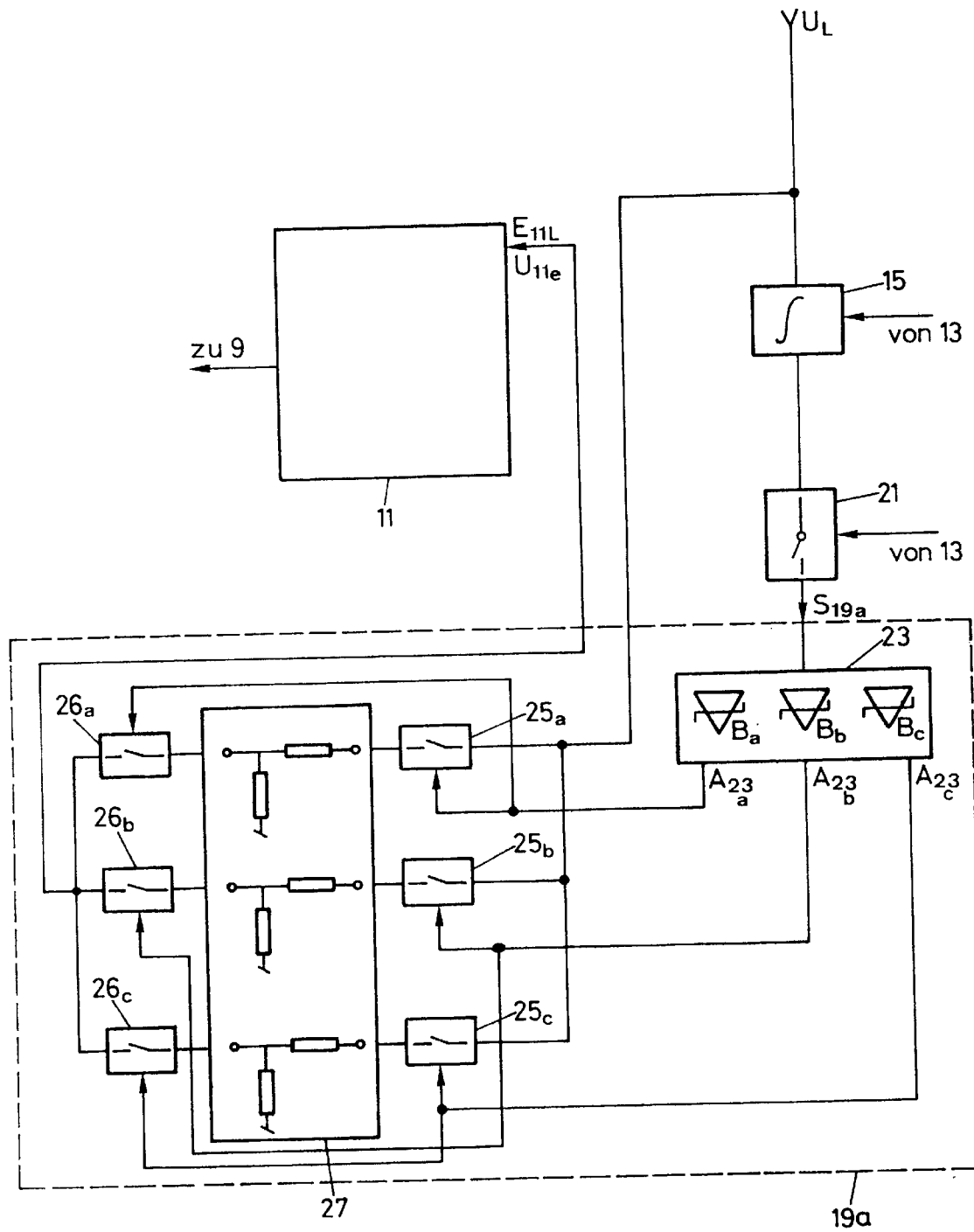
FIG. 2 is a diagram of a controlled weighting unit for a battery charger according to the present invention.

FIG. 2 shows a preferred embodiment of the weighting unit 19, which is characterized by great simplicity. As discussed hereinbefore, the charging voltage $U_L$ is supplied to the averaging unit 15, which, in turn supplies an averaged voltage control signal to the weighting unit 19 via the switch unit 21. The charging voltage $U_L$ is supplied to a comparator unit 23 via the switch unit 21. The switch unit 21 is controlled by the time control unit 13 and, if necessary, averaging is performed at unit 15. As is shown schematically, comparator unit 23 determines in which of three voltage ranges, $B_a$, $B_b$, $B_c$ input signal resides. These ranges are determined by defining the comparator switching limits (not shown). The comparator stage which corresponds to the input voltage generates an output signal, $A_{23a}$, $A_{23b}$, $A_{23c}$ respectively. Each output $A_{23a}$, $A_{23b}$, $A_{23c}$ is connected to a switch unit $25_a$, $25_b$, $25_c$ respectively. Depending on which of the outputs $A_{23a}$, $A_{23b}$, $A_{23c}$ is activated, the corresponding switching unit $25_a$, $25_b$, $25_c$ is activated. In this way the charging voltage $U_L$ is switched to a voltage divider unit 27, which associates a corresponding voltage divider value with each switch unit $25_a$, $25_b$, $25_c$. The outputs of the voltage dividers are connected, via the decoupling switch units $26_a$, $26_b$, $26_c$ of the input $E_{11L}$ to the monitoring unit 11. Corresponding switch units $25_a$, $26_a$; $25_b$, $26_b$; $25_c$, $26_c$ are closely simultaneously until another of the outputs $A_{23a}$, $A_{23b}$, $A_{23c}$ is activated by the input signal to the comparator unit 23, at times controlled by the timer unit 13.

With reference to FIG. 2, it is clear that the time control unit 13 can control the switch units 21, 25, and 26 as well as the integration unit 15 repetitively at a high repetition frequency. Thus, if a local oscillator is used as the time control unit 13 and, optionally, if the integration unit 15 is not used, the weighting factor may be continuously adjusted by the appropriate voltage divider value.

In a preferred embodiment, the voltage divider unit 23 is a digital potentiometer of the type manufactured and sold by Xicor, e.g. via AVNET E2000 AG, Elektronische Bauelemente, Bohnirainstrasse 11, CH-8801 Thalwil, under the trademark $E^2$POT Workbook, wherefrom pages 1 to 16 are incorporated herein by reference to the present description and included as Appendix A to the present description.

In the case of the preferred embodiment illustrated in FIG. 2, the switch units 25 and 26 can be implemented with analog switches. The voltage divider unit 27 is as an integrated circuit. The voltage supplied to the input $E_{11L}$ is, in each case, reduced with respect to the charging voltage $U_L$, so that the measurement range M in accordance with FIG. 1 is to be designed for the smallest charging voltages which are to be monitored.

Figure 3:
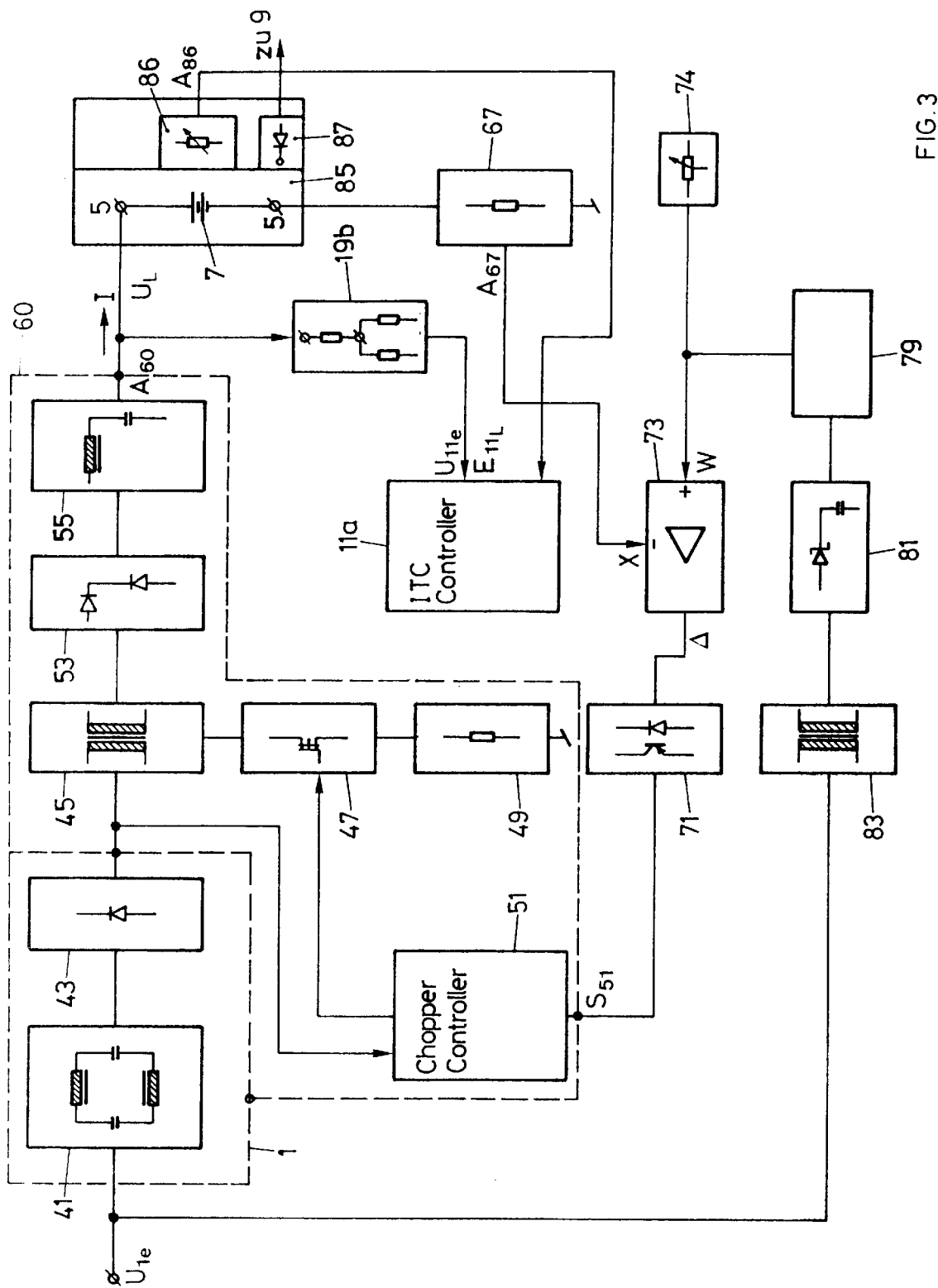
FIG. 3 is a functional block diagram of a battery charger in accordance with the present invention.

FIG. 3 shows a detailed signal flow and functional block diagram of the invention explained thus far. The AC voltage $U_{1e}$ is supplied to a band pass filter 41 comprised of an LC filter, then rectified in a rectifier unit 43. Filter 41 and rectifier unit 43, outlined with a dashed line in FIG. 3, form the AC/DC converter 1 as shown in FIG. 1. Then the DC voltage signal $U_{1a}$ is supplied from the output side of the rectifier unit 43, to the primary side of a transformatory high frequency transmitter at a transmitter unit 45. The primary-side signal of the transformatory transmitter unit 45 is choppered by means of a MOS-FET chopper unit 47 with a controlled duty cycle via an ohmic load unit 49 to a reference potential with a pulse repetition frequency $f_{27}$ of 80 kHz. The duty cycle of the chopper unit 47 is controlled by means of a control unit 51, which is supplied from the output voltage $U_{1a}$ of the AC/DC converter 1.

The output signal of the transformatory transmitter 45 is rectified at a rectifier unit 53 and then smoothed by filter unit 55. The transmitter unit 45, chopper unit 17, loading unit 49, chopper-control unit 51, rectifier unit 53, filter unit 55, form a controllable direct voltage source 60, outlined with a dashed line in FIG. 3, which is part of the transfer unit 3 shown in FIG. 1. The control input $S_{51}$ to the control unit 51, controls the chopper duty cycle of the chopper unit 47 and thus the current output I.

The output $A_{60}$ of the current source 60 is supplied to one charging output 5 (see FIG. 1) for connection to an accumulator battery 7 which is to be recharged. The second of the outputs 5 of the charging unit is connected via a current measuring unit 67 to a reference potential. The charging voltage $U_L$ at the output $A_{60}$ of the current source 60 is supplied to the weighting unit 19b. The weighting unit 19b is constructed as shown in FIG. 2.

Not shown in FIG. 3 for the sake of clearness, are the time control unit 13, the switch unit 21, the average value formation unit 15, the comparator unit 23, the switch units 25 and 26 and the voltage divider unit 27.

On the output side of the weighting unit 19b the signal $U_{11c}$ is supplied to the input $E_{11L}$ of the monitoring unit $11_a$ is preferably an integrated charging controller IC, in particular the IC U2402B manufactured by Telefunken. The input $E_{113}$ corresponds to the "sense UBATT" input of the aforementioned IC.

The output $A_{67}$ of the current measuring unit 67 is supplied to a comparator unit 73 and, insofar as the above-mentioned IC is used and the comparator unit 73 is incorporated into the IC, to its "sense I-charge" input.

An output signal of a presetting unit 74 is also supplied to the comparator unit 73. In the presetting unit 74, and the charging current nominal or rated value is adjusted, the output signal of the unit 74 is fed to the comparator unit 73 as a rated signal W. The signal at the output $A_{67}$ of the current measuring unit 67, is supplied to the comparator 73, as a measured actual value signal X. On the output side of the comparator unit 73 is a negative feedback control difference signal Δ is generated. The difference signal Δ is galvanically decoupled via an optical coupler unit 71 and applied to the control input $S_{51}$ of the control unit 51.

The rated signal W from the presetting unit 74 is generated from an output signal of a reference voltage generator 79 generated from a stabilized reference voltage source. The generator 79 is fed via a separate supply circuit 81 and via a transformatory transmitter 83 from the AC voltage $U_{1e}$.

A temperature measuring unit 86, preferably in the form of an NTC resistor, is thermally coupled to the accumulator battery 7 to be charged, and attached to a holder 85 for the accumulator battery 7 to be charged. A temperature-dependent output signal $A_{86}$ from the temperature measuring unit 56 is supplied to the monitoring unit 11a for monitoring purposes.

In order to detect if an accumulator battery 7 is actually a rechargeable battery or a non-rechargeable battery, a detector 87 is preferably provided in the holder 85. The detector 87 recognizes if the charging process is permissible or not on the basis of specific marks on the battery housing, such as barcodes or specific mechanical configurations of the housing, such as notches. Detector 87 activates/deactivates a charging operating switch 9, shown in FIG. 1 but not shown in FIG. 3.

It is also possible for the detector 87 to transmit the necessary monitoring data, and/or control information directly to the monitoring unit 11a, or to the control unit for the direct voltage source 60, if the corresponding information is provided on the batteries to be charged.

Figure 4:
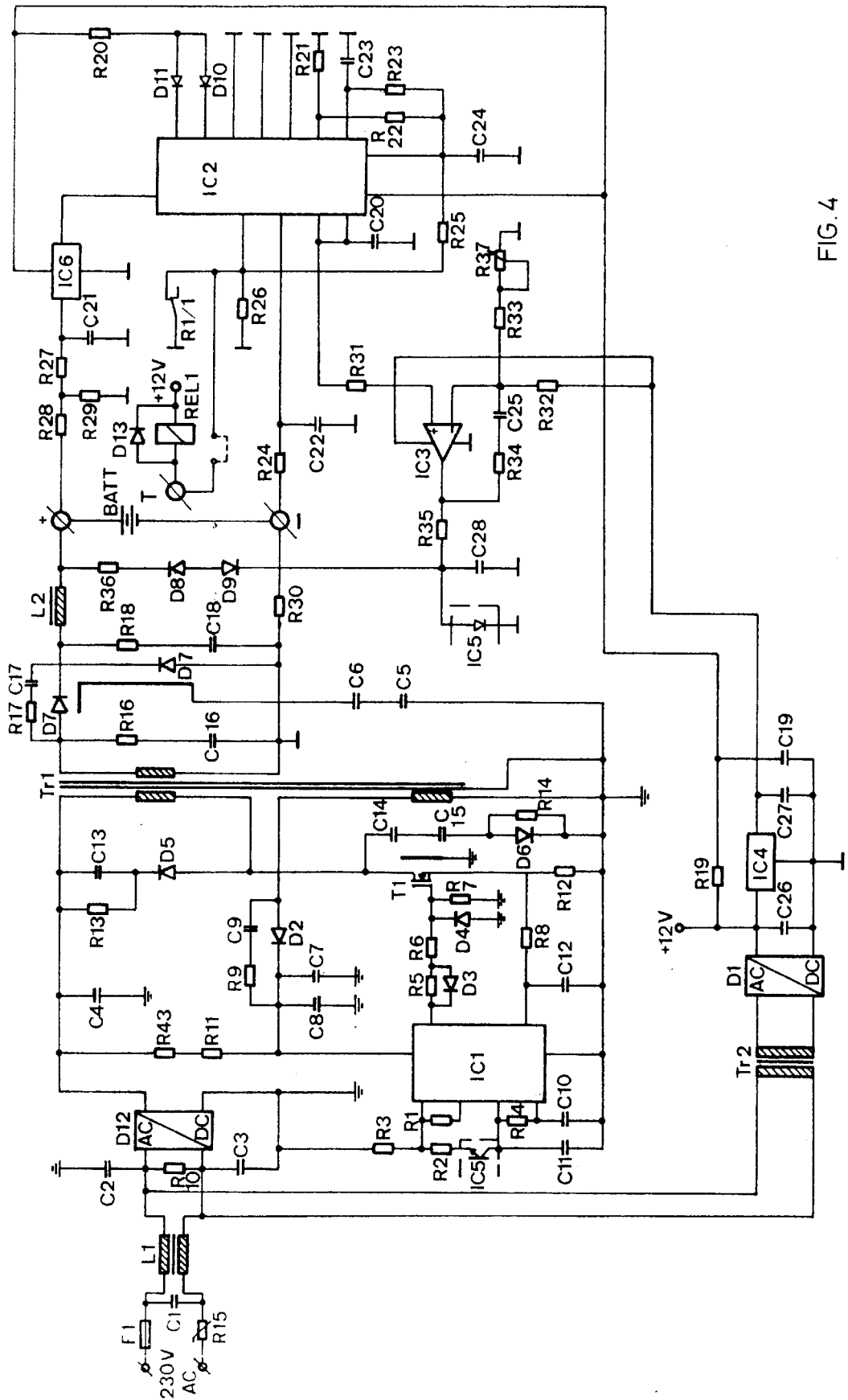
FIG. 4 is a detailed circuit diagram of a battery charger in accordance with the present invention.

FIG. 4 shows the circuit diagram of a battery charger constructed in accordance with the principle of the invention as shown in FIG. 3.

The following is a list of the values of the discrete electronic elements:

| RESISTORS | | | | | |
|---|---|---|---|---|---|
| R01 | 10 KΩ | R14 | 10 KΩ | R27 | 10 KΩ |
| R02 | 10 KΩ | R15 | 8 Ω | R28 | 16 KΩ |
| R03 | 2.7 KΩ | R16 | 22 Ω | R29 | 3.3 KΩ |
| R04 | 12 KΩ | R17 | 47 Ω | R30 | 0.01 Ω |
| R05 | 82 Ω | R18 | 47 Ω | R31 | 10 KΩ |
| R06 | 22 Ω | R19 | 10 Ω | R32 | 100 KΩ |
| R07 | 10 KΩ | R20 | 2.2 KΩ | R33 | 820 Ω |
| R08 | 1 KΩ | R21 | 56 KΩ | R34 | 1.5 KΩ |
| R09 | 4.7 Ω | R22 | 10 KΩ | R35 | 510 Ω |
| R10 | 470 KΩ | R23 | 470 KΩ | R36 | 2.4 KΩ |
| R11 | 56 KΩ | R24 | 2.2 KΩ | R37 | trimmer 2 KΩ |
| R12 | 0.39 Ω | R25 | 15 KΩ | R43 | resistor 56 KΩ |
| R13 | 10 KΩ | R26 | 6.8. KΩ | | |

| CAPACITORS | | | | | |
|---|---|---|---|---|---|
| C01 | 0.47 μF | C10 | 4.7 nF | C19 | 220 μF |
| C02 | 1 nF | C11 | 100 nF | C20 | 1 μF |
| C03 | 1 nF | C12 | 470 pF | C21 | 470 nF |
| C04 | 150 μF | C13 | 1 nF | C22 | 10 μF |
| C05 | 4.7 F | C14 | 1 nF | C23 | 1 nF |
| C06 | 4.7 F | C15 | 1 nF | C24 | 22 μF |
| C07 | 100 μF | C16 | 1 nF | C25 | 22 nF |
| C08 | 100 nF | C17 | 1 nF | C26 | 220 μF |
| C09 | 10 nF | C18 | 1 nF | C27 | 100 μF |
| | | | | C28 | 22 μF |

| DIODES | | | |
|---|---|---|---|
| D01 | diode DF-01M | D08 | z-diode ZPD22 |
| D02 | diode 1N4007 | D09 | diode 1N4148 |
| D03 | diode 1N4148 | D010 | LED diode GREEN |
| D04 | z-diode ZPD22 | D011 | LED diode RED |
| D05 | diode RGP 15M | D012 | diode KBU 4K |
| D06 | diode RGP 15M | D013 | diode 1N4007 |
| D07 | diode BYW 99 PI-200/FEP 30DP | | |

| INTEGRATED CIRCUIT | | |
|---|---|---|
| IC1 | SGS-THOMSON | UC3842N |
| IC2 | ITC | 9504-A |
| IC6 | ITC-AR | 9509-AR |
| IC3 | SGS/NATIONAL | LM358AN |

-continued

INTEGRATED CIRCUIT

| IC4 | SGS/NATIONAL | LM78L05 |
|---|---|---|
| IC5 | SIEMENS | CNY17F3 |
| TO1 | SGS-THOMSON | |
| POWER | MOS-FET | SDS-DE1E-M |
| REL1 | SDS | |

INDUCTORS

| L01 | TIMONTA | SPOOL 2X27 HY-DFKY, 2-31-1.4-27A |
|---|---|---|
| L02 | HARTU | THROTTLE 200025-14-10.0 A/250 V, 0,30 MH/GKK |

TRANSFORMERS

| TR1 | TRANSFORMER FERRIT PG3-2/30-H7C4 |
|---|---|
| TR2 | TRANSFORMER 220 V/12 V-1.5, VA-50-60 HZ |

FUSES

| F1 | FUSE 1.60 AT |
|---|---|

Figure 5:
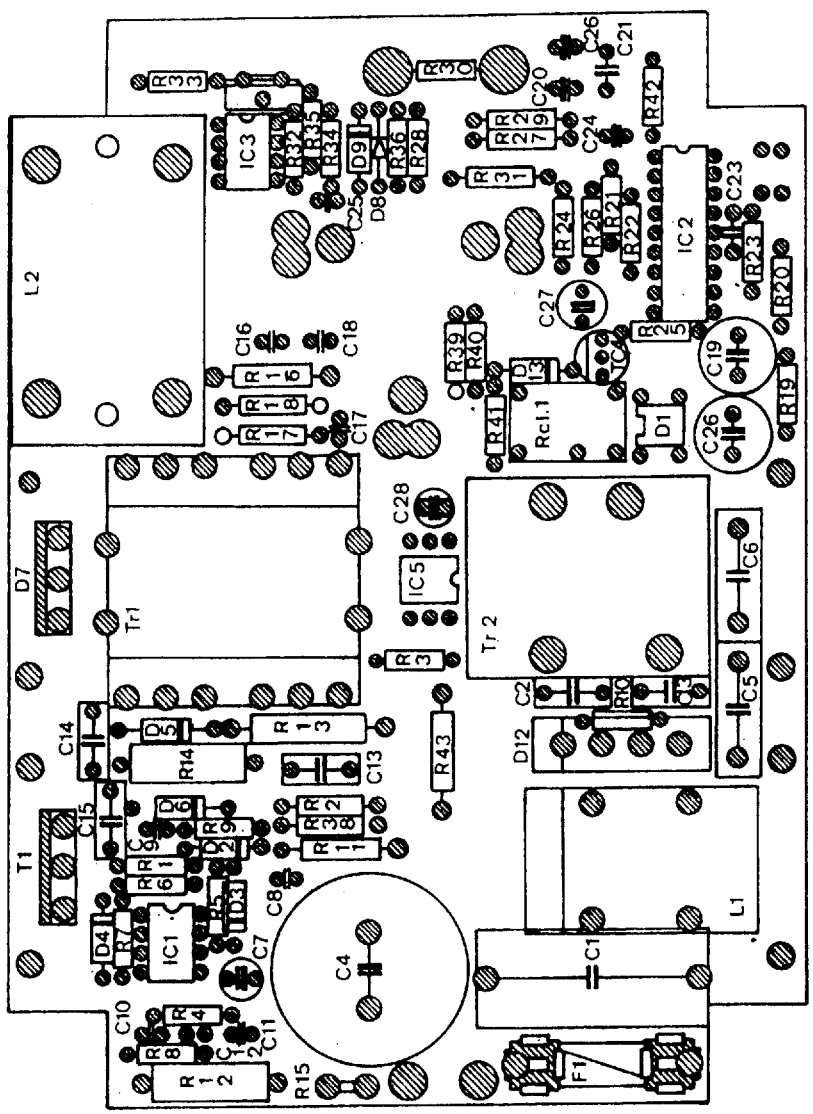
FIG. 5 is a top view of the circuit board of the battery charger according to the present invention with the discrete components thereon.

FIG. 5 shows a top view of a printed circuit for realizing the battery charger according to FIGS. 1–4.

With the battery chargers in accordance with the invention described it was possible to charge batteries in a rated-voltage range between 1.2 V and 14.4 V, and preferably between 2.4 V and 14.4 V, with around 7.6 A and in a charging time of around 10 min. at an optimal rate.

In a preferred form of constructional realization, all the connecting lines and electronic components, which treat low level measuring, monitoring etc., signals are grouped on one circuit board as one low level module. All elements and connecting lines treating higher value current and voltages are realized on a second board as a second module, and the two modules are linked in a removable manner. This has the advantage that further improvements and amendments to the circuitry, which are primarily directed to the low level signal processing, may be realized on one of the modules which may easily be exchanged leaving the high level current module unchanged. The low level module is thereby preferably realized in thick film technique.

Up to now the process invented was explained with a focus on optimal adjustment of the battery charger to different rated voltages of an accumulator battery to be charged. The battery charger, and/or process, in accordance with the invention, is now further improved taking into account different capacities (Ah) of the accumulator battery. This will be explained by means of FIG. 6, which, based on the presentation in FIG. 1, shows the main principles of this further development.

Figure 6:
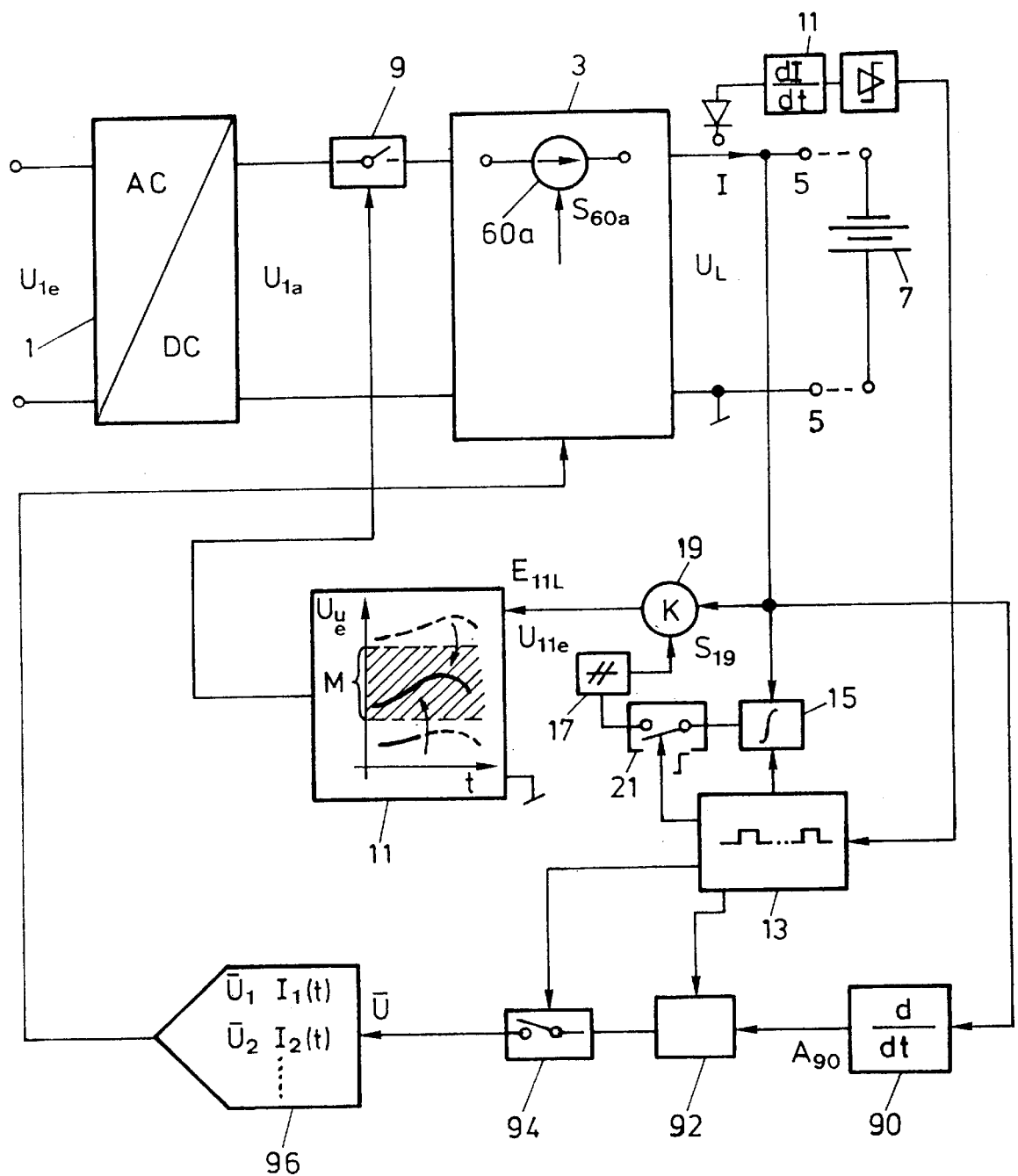
FIG. 6 is a functional unit/signal flow diagram of a battery charger incorporating a charging current control.

As shown in FIG. 6, the charging voltage $U_L$ is supplied to a differentiation unit 90. At an output $A_{90}$ of the differentiation unit 90, a signal is generated with a level which is dependent on the variation of $U_L$ over time t. Analogous to the average value formation or integration unit 15, an average value formation unit 92 is provided, which forms the average value of the differentiation result, during a time span controlled by time control unit 13.

Controlled by the time control unit 13, a switch unit 94 switches the average value result of the differentiated signal to a memory unit 96. The signal fed to unit 96 is designated as $\overline{U}$. Depending on the value of the signal $\overline{U}$, (for example corresponding to the initial rise of the charging voltage $U_L$ determined over a predetermined time span). Unit 96 activates a predetermined charging current behavior function $I_x(t)$ that controls a controllable current source 60a via its control input $S_{60a}$, at the transmission unit 3. Thereby, a conclusion is drawn with regard to the capacity of the battery 7 being charged, which is defined by the $U_L$-time derivative, particularly from the initial charge behavior, and correspondingly an optimal charging current time-behavior is controlled at the current source 60a, which may be a constant charging current.

If one considers the embodiment shown in FIG. 3 with the use of a charging controller-IC of the above-mentioned type as a monitoring unit 11a, it becomes clear that the improvement in accordance with FIG. 6 may be directly realized by replacing the adjusting unit 74 for controlling the charging current at the current source 60 (FIG. 3) by a control with the unit 96 in accordance with FIG. 6

Figure 7:
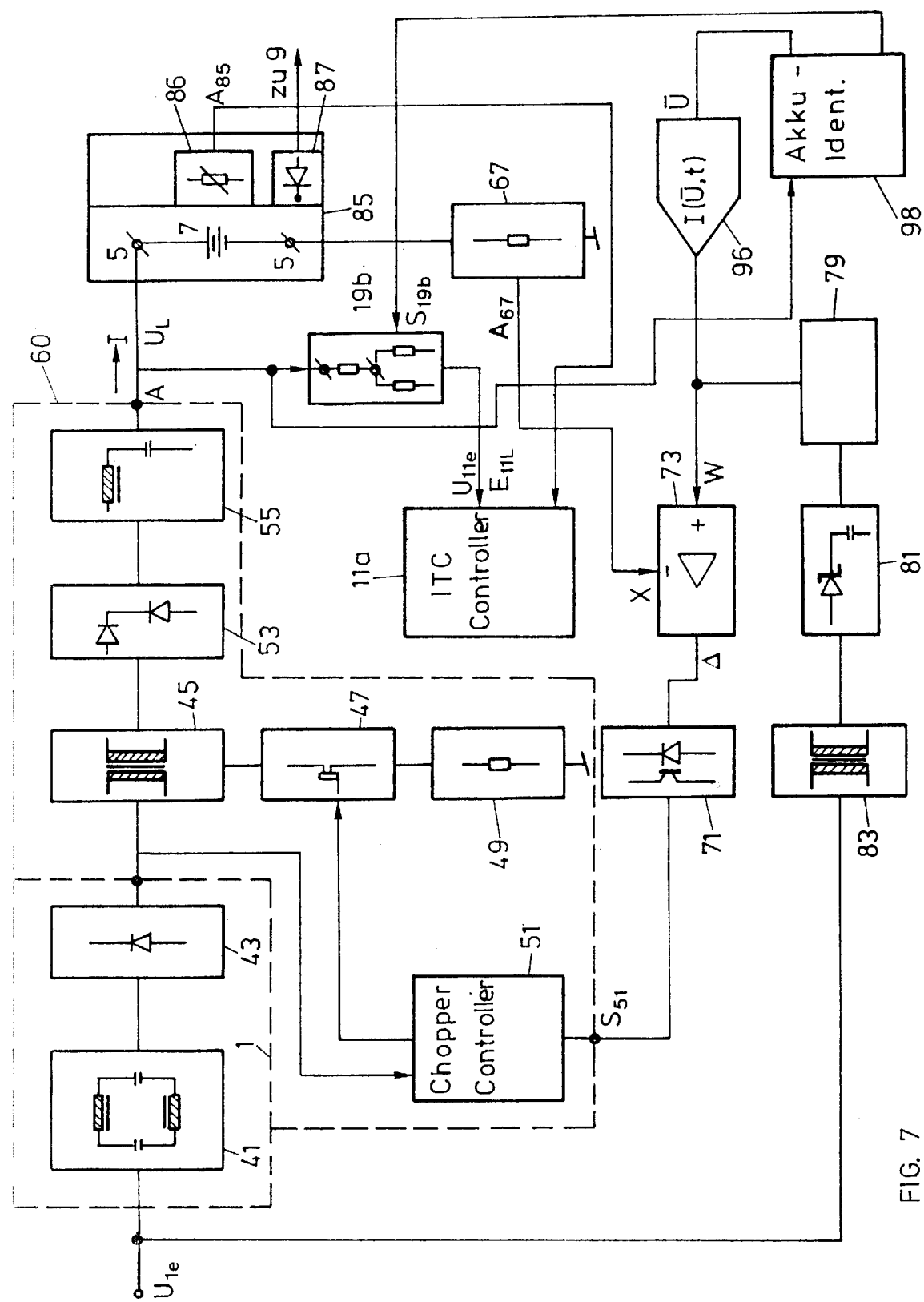
FIG. 7 is a functional block diagram of a battery charger incorporating a charging current control.

FIG. 7 illustrates an improvement in accordance with FIG. 6 based upon the embodiment shown in FIG. 3.

In FIG. 7, the charging voltage $U_L$ is fed to a battery identification unit 98, which includes the units 15, 21, 23 shown in FIG. 2, and the units 90, 92, and 94 shown in FIG. 6, as well as the control unit 13 shown in FIG. 1. On the output side of the identification unit 98 there appears in accordance with FIG. 2, a signal 19b supplied to the weighting unit $S_{19b}$, and the signal $\overline{U}$, which is supplied to the charging current course selection unit 96, in accordance with FIG. 6.

What is claimed is:

1. A process for automatically adjusting a battery charger according to an accumulator battery being charged, comprising the steps of:
    supplying a charging current to said battery;
    sensing a terminal voltage of said battery to generate a sense signal;
    amplifying said sense signal by an amplification factor to generate a control signal;
    checking time behavior of said control signal and generating a check-result signal as soon as a predetermined criterion is fulfilled by said time behavior of said control signal;
    controlling said charging current as a function of said check-result signal; and
    automatically adjusting said amplification factor as a function of said sense signal so as to set said control signal being checked within a predetermined range of magnitude.

2. The process of claim 1, wherein said adjusting is performed repeatedly during supplying a charging current to said battery.

3. The process of claim 2, wherein said adjusting of said amplification factor is performed continuously.

4. The process of claim 2, wherein said automatic adjusting of said amplification factor is performed at discrete moments of time.

5. The process of claim 1, wherein checking of said time behavior is performed according to a time derivative of said control signal.

6. The process of claim 5, whereby checking said time behavior of said control signal is performed according to a second time derivative of said control signal.

7. The process of claim 1, further comprising the steps of:
    providing a controllable current source supplying a charging current to said battery;

adjusting said charging current as a function of said sense signal.

8. The process of claim 7, further comprising the step of negative feedback controlling said current source to follow a rated signal and adjusting said charging current as a function of said sense signal by adjusting said rated signal as a function of said sense signal.

9. The process of claim 1, comprising the step of charging a battery with a rated voltage in the range of 1.2 V to 14.4 V in a charging time of around 10 minutes.

10. A device for charging an accumulator battery, comprising:

an AC to DC converter, an input of said converter being operationally connected to an AC input of said device, an output of said converter being operationally connected to charging tabs for the battery to be charged;

an automatically controlled amplification unit, the input thereof being operationally connected to said output of said converter, said unit generating at its output a signal resulting from amplification of a signal at its input multiplied by an automatically controlled amplification factor and having a magnitude within a predetermined magnitude range, a control input of said amplification unit controlling said amplification factor being as well operationally connected to said output of said converter, the output b said amplification unit being operationally connected to an input of a monitoring unit monitoring timer behavior of a signal at its input, the output of said monitoring unit being operational connected to a charge current controlling unit interconnected between said input of said converter and one of said charging tabs.

11. The device of claim 10, wherein said monitoring unit monitors a time derivative of said input signal applied to said input of said amplification unit.

12. The device of claim 10, wherein said monitoring unit monitors the second order time derivative of said signal applied to said input of said monitoring unit.

13. The device of claim 10, further comprising a timing unit controlling time spans during which said control input of said amplification unit is enabled to adjust said amplification factor.

14. The device of claim 13, wherein said timing unit provides repetitively for said time spans.

15. The device of claim 10, wherein said amplification factor of said amplification unit is continuously adjusted.

16. The device of claim 10, wherein said monitoring unit comprises a charge controller integrated circuit.

17. The device of claim 10, wherein said amplification unit comprises a controllably adjustable voltage divider network.

18. The device of claim 10, wherein said amplification unit comprises a digitally controllable potentiometer.

19. The device of claim 10, wherein said control input of said amplification unit is operatively connected via a comparator unit to said charging tabs, said comparator unit comprising at least two stages, wherein each of said stages generates an output signal if a value of a voltage at said tabs resides within a stage-specific signal range.

20. The device of claim 10, wherein a controllable DC current source is interconnected between the output of said AC to DC convertor and one of said charging tabs, and wherein a control input of said current source is operatively connected to said charging tabs.

21. The device of claim 20, wherein said charging tabs are operatively connected to a differentiation unit generating a time derivative signal of its input signal, an output signal of said differentiation unit being operatively connected to said control input of said current source.

22. The device of claim 21, wherein the output of said differentiation unit is operatively connected to the input of a selection unit, said selection unit being operatable to select at least one stored signal value or at least one signal time-course in response to an output signal of said differentiation unit, an output of said selection unit being operatively connected to the control input of said current source.

23. The device according to claim 22, wherein said selection unit generates an output signal, said output signal being fed as a rated signal to a negative feedback control loop for a charging current to said tabs, said negative feedback control loop comprising said current source as an adjusting member.

24. The device according to claim 10, further comprising a controllable DC-current source interconnected between the output of said AC to DC converter and one of said charging tabs, said controllable DC-current source comprising a duty cycle modulatable chopper unit for adjusting an output current of said current source.

25. A device according to claim 10, further comprising a current measuring arrangement and a current selecting unit, an input of said current measuring arrangement being operatively connected to a charging current loop, an output of said current measuring arrangement being operatively connected to a first input of a difference forming unit, an output of said current selecting unit being connected to a second input of said difference forming unit, an output of said difference forming unit being operatively connected to a control input of a charging current generating source.

26. The device of claim 10, providing a substantially constant time-span of battery charging, irrespective of the rated voltage of said battery, within a range of 0.2 V and 14.4 V.

27. The device of claim 26, wherein said time-span is approximately 10 minutes.

28. The device of claim 10, further comprising a temperature measuring arrangement for measuring a temperature of the accumulator battery to be charged, an output of said temperature measuring arrangement being operatively connected to at least one of said monitoring unit and of a control input of a charging current source.

29. The device of claim 10, wherein a first module handles first level charging signals and measuring signals and a second module handles second level charging signals and measuring signals and wherein said first level signals are higher than said second level signals and wherein further said modules are removably exchangeable.

30. The device of claim 10, further comprising;

a holder for holding said accumulator battery to be charged;

a detector arrangement adjacent said holder for detecting a characteristic at said accumulator battery to be charged, an output of said detector unit being operatively connected to at least one of a charge-process initiating switch and of said monitoring unit.

31. The device of claim 30, wherein said detector arrangement selects an optical characteristic at said accumulator.

32. The device according to claim 30, wherein said detector arrangement detects a mechanical characteristic of said accumulator battery.

* * * * *

UNITED STATES PATENT AND TRADEMARK OFFICE
CERTIFICATE OF CORRECTION

PATENT NO. : 5,838,142
DATED : November 17, 1998
INVENTOR(S) : Wyss et al.

It is certified that error appears in the above-identified patent and that said Letters Patent is hereby corrected as shown below:

On the Title Page, Section [75], delete "Starrkiach" and insert --Starrkirch--.

Column 1, Line 13, delete "charger s" and insert --chargers--.

Column 5, Line 35, delete "11," and insert --11a--.

Column 9, Line 26, delete "b" and insert --of--.

Column 10, Line 53, delete "said" and insert --an--.

Signed and Sealed this

Fourth Day of May, 1999

Attest:

Q. TODD DICKINSON

*Attesting Officer*    Acting Commissioner of Patents and Trademarks